(12) United States Patent
Easwaran et al.

(10) Patent No.: US 8,093,925 B2
(45) Date of Patent: Jan. 10, 2012

(54) CURRENT DRIVER CIRCUIT

(75) Inventors: Sri N. Easwaran, Freising (DE); Michael Wendt, Wasserburg (DE)

(73) Assignee: Texas Instruments Deutschland GmbH, Freising (DE)

(*) Notice: Subject to any disclaimer, the term of this patent is extended or adjusted under 35 U.S.C. 154(b) by 10 days.

(21) Appl. No.: 12/540,222

(22) Filed: Aug. 12, 2009

(65) Prior Publication Data

US 2010/0039144 A1 Feb. 18, 2010

Related U.S. Application Data

(60) Provisional application No. 61/141,919, filed on Dec. 31, 2008.

(30) Foreign Application Priority Data

Aug. 13, 2008 (DE) .................. 10 2008 038 840

(51) Int. Cl.
*H03B 1/00* (2006.01)

(52) U.S. Cl. ........ 327/108; 327/170; 327/374; 327/427; 327/478; 326/21; 326/82; 701/45

(58) Field of Classification Search .......... 327/170–174, 327/374–377, 108–112, 427–434, 478–482; 326/21–24, 26, 27, 82–83, 87; 701/45; 208/735
See application file for complete search history.

(56) References Cited

U.S. PATENT DOCUMENTS

| | | | | |
|---|---|---|---|---|
| 5,610,547 A * | 3/1997 | Koyama et al. | ............... | 327/350 |
| 7,538,587 B2 * | 5/2009 | Iwagami et al. | ............... | 327/108 |
| 7,789,558 B2 * | 9/2010 | Yoshida et al. | ............... | 374/178 |
| 2008/0187026 A1 * | 8/2008 | Ueda | ............... | 374/185 |
| 2009/0322426 A1 * | 12/2009 | Nyboe et al. | ............... | 330/251 |

FOREIGN PATENT DOCUMENTS

DE 10 2004 049 082 4/2008

OTHER PUBLICATIONS

"CMOS Circuit Design, Layout, and Simulation," IEEE Press Series on Microelectronic Systems, Stuart K. Tewksbury, Series Editor, Chapter 7 CMOS Passive Elements, pp. 134-139 (R. Jacob Baker, Harry W. Li and David E. Boyce).

"The Art of Analog Layout," Pearson Education Asia and Tsinghua University Press, 2004, S. 176, 177, 249-253 (Alan Hastings).

* cited by examiner

*Primary Examiner* — Lincoln Donovan
*Assistant Examiner* — Shikha Goyal
(74) *Attorney, Agent, or Firm* — John J. Patti; Wade J. Brady, III; Frederick J. Telecky, Jr.

(57) ABSTRACT

An integrated regulated current drive circuit for driving a squib of an inflatable airbag has a current sense resistor connected in series with a load, and a reference resistor connected in series with a reference current source. Both resistors are matched to define a precise ratio of resistance values which determines the amount of current fed to the squib. Both resistors are implemented by combining a number of identical on-chip resistor elements.

7 Claims, 3 Drawing Sheets

CURRENT DRIVER CIRCUIT

CROSS-REFERENCE TO RELATED APPLICATIONS

This patent application claims priority from German Patent Application No. 10 2008 038 840.8, filed 13 Aug. 2008 and U.S. Provisional Application No. 61/141,919, filed 31 Dec. 2008, the entireties which are incorporated herein by reference.

TECHNICAL FIELD

The invention relates generally to an integrated circuit and, more particularly, to a regulated current driver typically used in a deploy circuit which drives a squib to inflate an airbag in a vehicle.

BACKGROUND

In an application such as an airbag squib driver, the firing currents are regulated to avoid any inadvertent firing. FIG. 1 shows a conventional deploy circuit 100 which generally comprises gate drivers 102 and 104, High Side Driver (HSD) Q1, a current limiting Low Side Driver (LSD) Q2, and pins or terminals 104, 106, 108, and 110. Both of the HSD Q1 and LSD Q2 are capable of driving a firing current of 1-2 A to inflate an airbag (through squib 112 and capacitors C1 and C2) and are is typically a high voltage LDMOS transistors (preferably N-type MOS transistors). The firing currents are generally regulated in order to help ensure a well controlled firing event, but conventional deploy circuits 100 have undesirable accuracy of current regulation and/or have an unavoidable systematic offset between two matched LDMOS transistors.

Some examples of conventional circuit are: German Patent Appl. No. 102004049082; and Baker et al., "CMOS Circuit Design, Layout, and Simulation," *IEEE Press*, 1998, pp. 136-139.

SUMMARY

In accordance with a preferred embodiment of the present invention, a metal resistor is used as a sense resistor. Since the current that flows through the HSD is of the order 1-2 A, a poly resistor for sensing is not affordable because it consumes too much die area. Hence, a metal resistor (Metal 3) in LBC5 process has been used to create the voltage drop. This voltage drop is compared with a reference voltage in order to regulate the current. This is shown in FIG. 4. The reference voltage is generated by using the series of Metal 3 resistors over which a constant current flows through. The reference current is trimmed in order to make this current independent of process, supply and temperature variations. This reference current is generated from the Bandgap circuit on chip.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
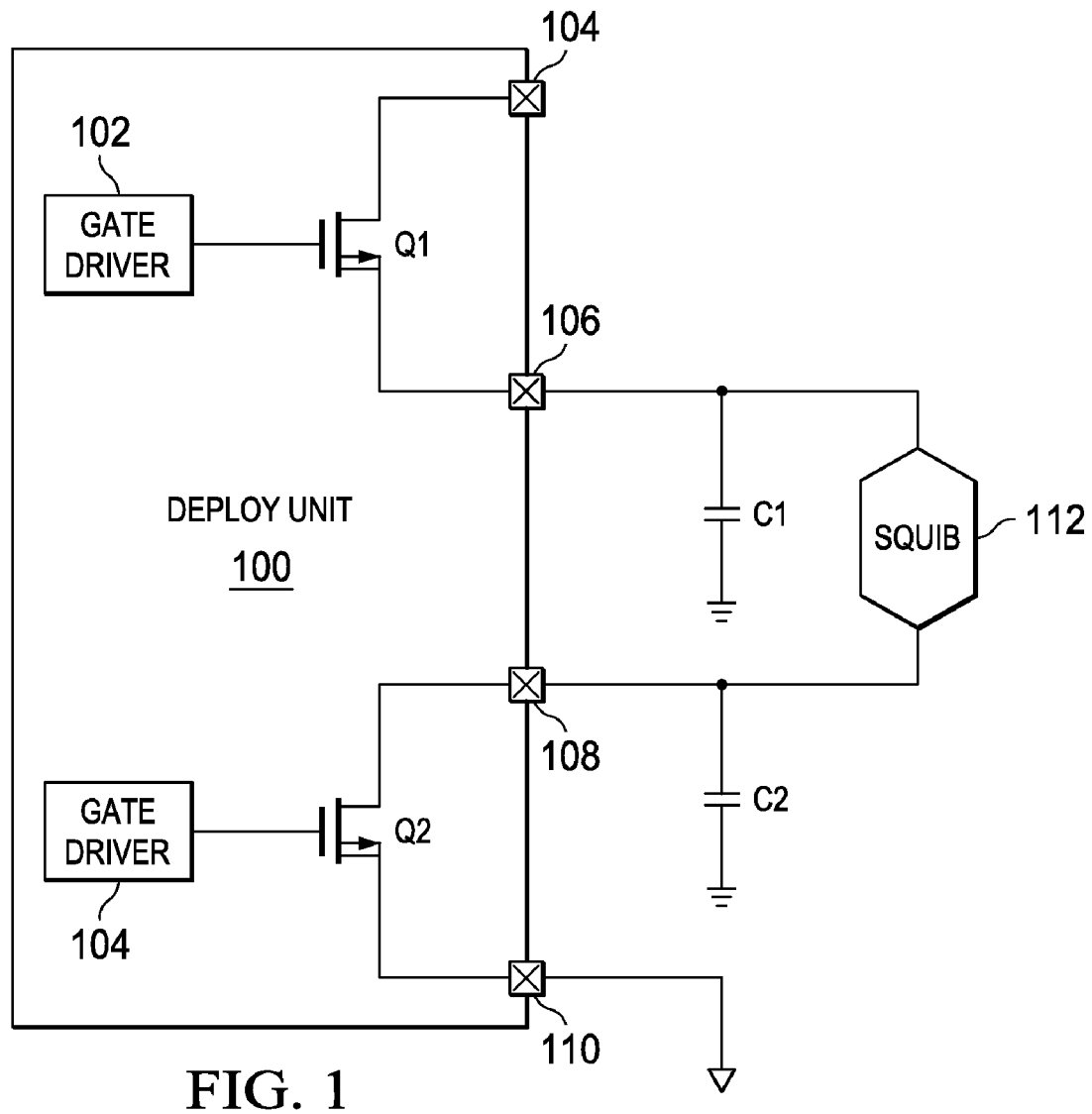
FIG. 1 is a schematic diagram of a deploy circuit driving a squib.
Figure 2:
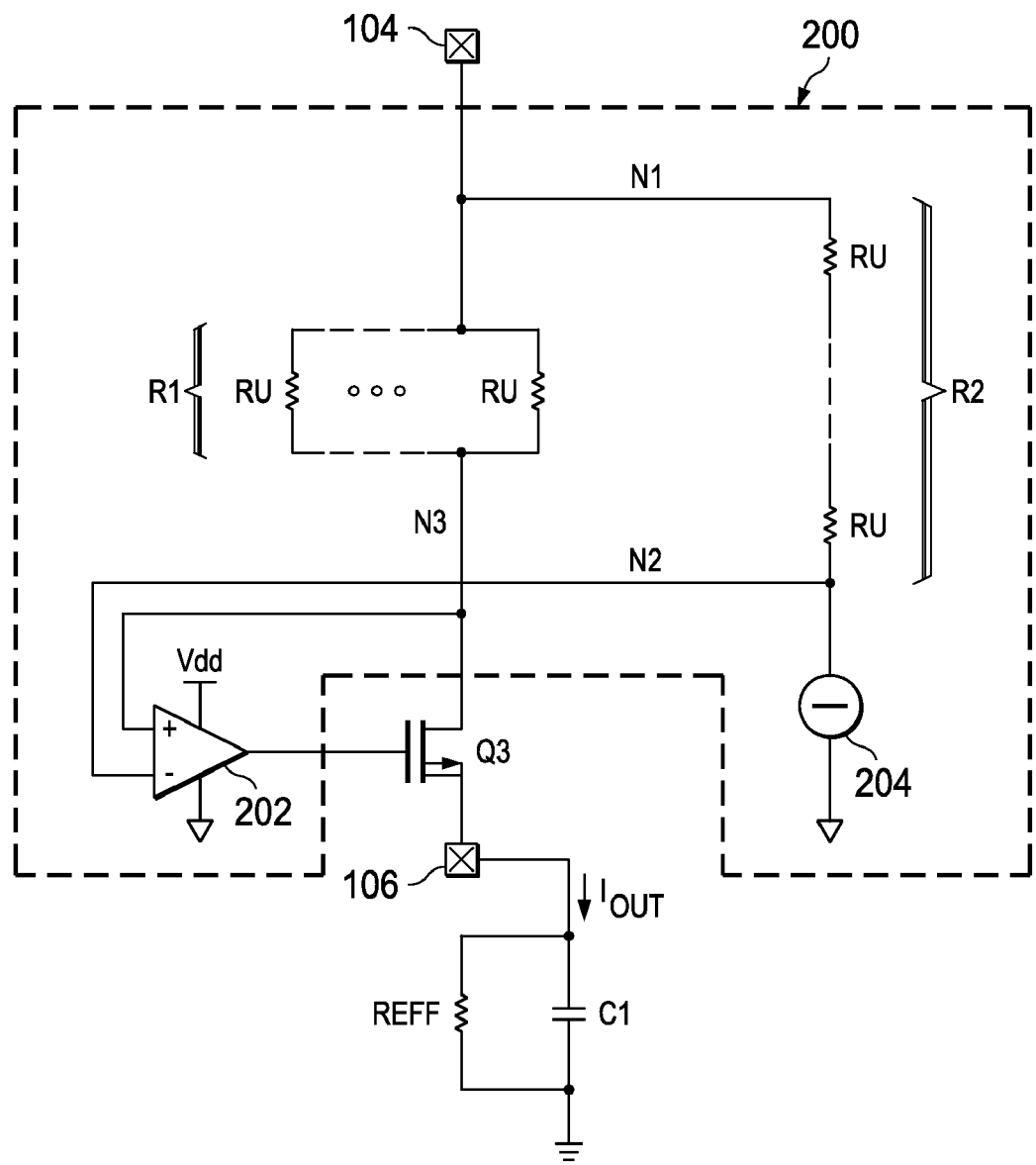
FIG. 2 is a schematic circuit diagram of an example of a gate driver circuit in accordance with a preferred embodiment of the present invention.
Figure 3:
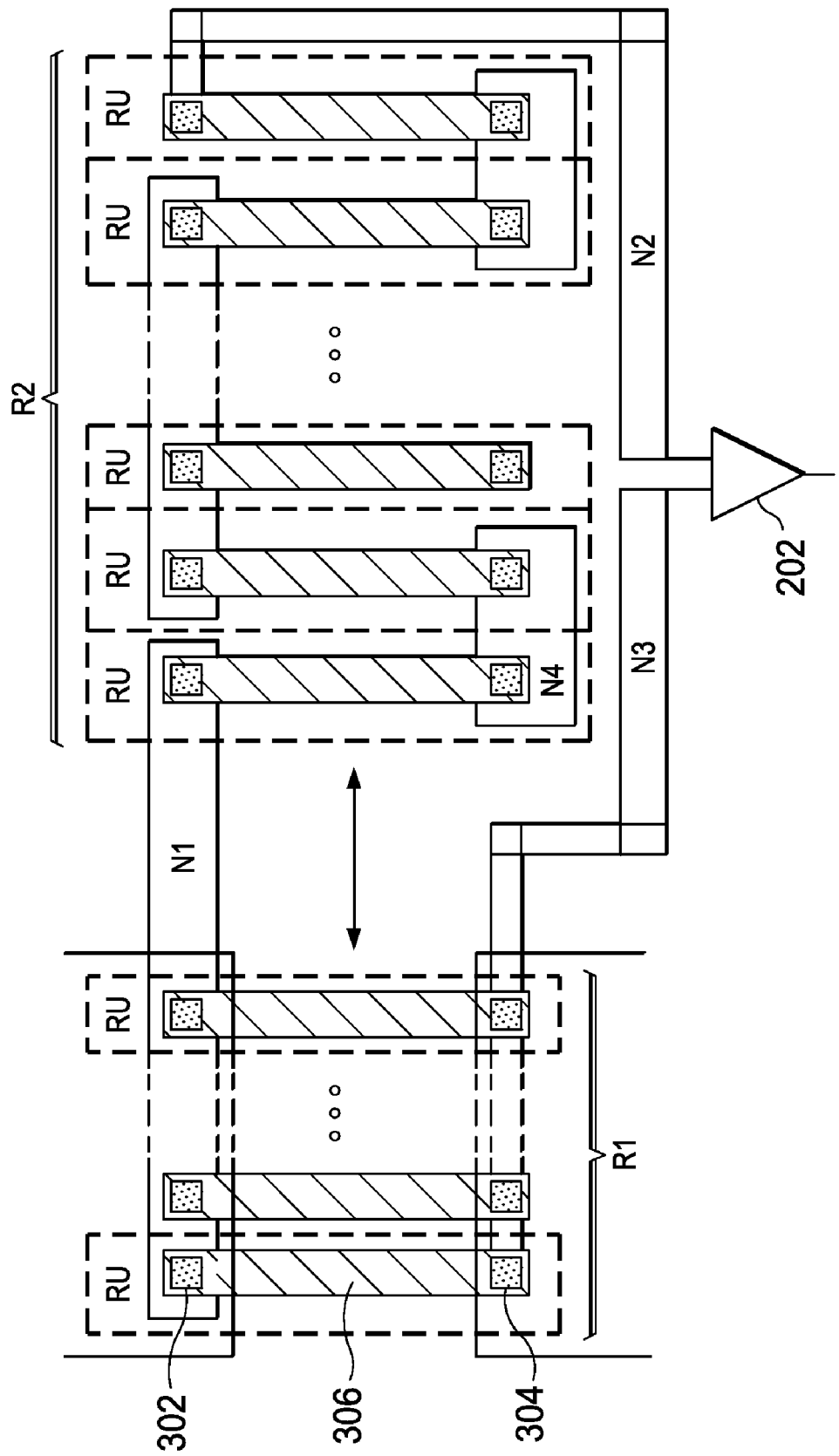
FIG. 3 is a diagram depicting an example of a layout for the sense resistors of FIG. 2.

Refer now to the drawings wherein depicted elements are, for the sake of clarity, not necessarily shown to scale and wherein like or similar elements are designated by the same reference numeral through the several views.

Referring to FIG. 4 of the drawings, the reference numeral 200 generally depicts an example of a gate driver circuit in accordance with a preferred embodiment of the present invention. Circuit 200 (which can replace the gate driver 102 of FIG. 1) generally comprises resistors R1 and R2, amplifier 202, and reference current source 204. Resistor R1 operates as a current sense resistor which is in the drain path of a transistor Q3 (which can generally replace HSD Q1 of FIG. 1) between terminal 104 and the drain of transistor Q3, while a squib (represented as a portion of resistor REFF) is in the source path of the transistor Q3 through terminal 106. Amplifier 202 compares the voltage drop across resistor R1 with a voltage drop across resistor R2 (which operates as a reference resistor and which is coupled in series with reference current source 204). In this configuration, the regulated current IOUT is $$IOUT = IREF * \frac{R2*(1+\Delta t)}{R1*(1+\Delta t)} + \frac{\Delta VOFF}{R1*(1+\Delta t)} = IREF * \frac{R2}{R1} + \frac{\Delta VOFF}{R1*(1+\Delta t)}, \quad (1)$$

wherein $\Delta VOFF$ is the offset error of amplifier 202 and $1+\Delta t$ is the temperature coefficient to the first order (which are generally the same for both resistors R1 and R2 if the resistors R1 and R2 are matched). As can be seen from equation (1), the ratio of the resistance of resistor R1 to the resistance of resistor R2 determines the current as the contribution of the error due to the offset of amplifier 202. This is achieved by implementing both resistors R1 and R2 as a combination of substantially identical metal resistors RU. Since the current through the resistor R1 is on the order of 1 A to 2 A, resistor R1 is implemented by coupling several metal resistors RU in parallel. Additionally, because the resistance of resistor R2 is much larger than that of resistor R1, resistor R2 is implemented by coupling several resistors RU in series.

As is seen in FIG. 5, the metal resistors RU (which form resistors R1 and R2) form an array of substantially parallel and equidistantly spaced metal strips (denoted by the metal layer 306) which are originally electrically isolated but can be contacted to different combinations (through vias 302 and 304) of parallel connected strips (at nodes N1 and N3) or series connected strips (such as node N4). Since all resistors RU are closely spaced metal strips implemented on-chip in the same technology, they have the same temperature coefficient, and matching of the resistors R1 and R2 is maintained over a large range of temperatures.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. An apparatus comprising:
    a first terminal;
    a second terminal;
    a first resistor that is coupled to the first terminal, wherein the first resistor includes a first set of metal resistors coupled in parallel with one another;
    a second resistor that is coupled to the first terminal, wherein the second resistor includes a second set of metal resistors coupled in series with one another, wherein each metal resistor from each of the first and second sets of metal resistors has substantially the same temperature coefficient;
    a current source that is coupled to the second resistor;
    an amplifier having inputs and an output, wherein the inputs of the amplifier are coupled to each of the first and second resistors; and
    a transistor having a first passive electrode, a second passive electrode, and a control electrode, wherein the first passive electrode is coupled to the first resistor, and wherein the second passive electrode is coupled to the second terminal, and wherein the control electrode is coupled to the output of the amplifier.

2. The apparatus of claim 1, wherein the first and second sets of metal resistor further comprise a plurality of metal strips that are substantially in parallel with one another.

3. The apparatus of claim 1, wherein the transistor further comprises an N-type LDMOS transistor with the first resistor coupled to its drain and the second terminal coupled to its source.

4. An apparatus comprising:
    a deploy unit including:
        a first terminal;
        a second terminal;
        a third terminal;
        a fourth terminal that is coupled to ground;
        a first resistor that is coupled to the first terminal, wherein the first resistor includes a first set of metal resistors coupled in parallel with one another;
        a second resistor that is coupled to the first terminal, wherein the second resistor includes a second set of metal resistors coupled in series with one another, wherein each metal resistor from each of the first and second sets of metal resistors has substantially the same temperature coefficient;
        a current source that is coupled to the second resistor;
        an amplifier having an inputs and an output, wherein the inputs of the amplifier are coupled to each of the first and second resistors;
        a first transistor having a first passive electrode, a second passive electrode, and a control electrode, wherein the first passive electrode of the first transistor is coupled to the first resistor, and wherein the second passive electrode of the first transistor is coupled to the second terminal, and wherein the control electrode of the first transistor is coupled to the output of the amplifier;
        a low side gate driver; and
        a second transistor having a first passive electrode, a second passive electrode, and a control electrode, wherein the first passive electrode of the second transistor is coupled to the third terminal, and wherein the second passive electrode of the second transistor is coupled to the fourth terminal;
    a squib that is coupled to the second and third terminals;
    a first capacitor that is coupled to the second terminal; and
    a second capacitor that is coupled to the third terminal.

5. The apparatus of claim 4, wherein the first and second sets of metal resistor further comprise a plurality of metal strips that are substantially in parallel with one another.

6. The apparatus of claim 4, wherein the first transistor further comprises an N-type LDMOS transistor with the first resistor coupled to its drain and the second terminal coupled to its source.

7. The apparatus of claim 4, wherein the second transistor further comprises an N-type LDMOS transistor with the third terminal coupled to its drain and the fourth terminal coupled to its source.

* * * * *